US009648443B1

(12) United States Patent
Mayron et al.

(10) Patent No.: US 9,648,443 B1
(45) Date of Patent: May 9, 2017

(54) SYSTEM, METHOD, AND COMPUTER PROGRAM FOR DEVICE MANAGEMENT

(71) Applicant: Amdocs Development Limited, Limassol (CY)

(72) Inventors: Yuval Yakov Mayron, Natanya (IL); Shimon Shay Elnatan, Petach-Tikva (IL); Matan Hadadi, Rishon le-Zion (IL)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/003,687

(22) Filed: Jan. 21, 2016

(51) Int. Cl.
*H04M 3/00* (2006.01)
*H04W 4/00* (2009.01)
*H04L 29/08* (2006.01)
*H04M 15/00* (2006.01)
*H04W 8/26* (2009.01)
*H04W 4/24* (2009.01)
*H04W 4/18* (2009.01)
*H04W 8/18* (2009.01)

(52) U.S. Cl.
CPC .......... *H04W 4/001* (2013.01); *H04L 67/303* (2013.01); *H04M 15/715* (2013.01); *H04M 15/705* (2013.01); *H04W 4/18* (2013.01); *H04W 4/24* (2013.01); *H04W 8/18* (2013.01); *H04W 8/265* (2013.01)

(58) Field of Classification Search
CPC ......... H04W 4/24; H04W 8/18; H04W 4/001; H04W 8/265; H04W 4/18; H04M 15/705; H04M 15/715
USPC ................ 455/405–407, 418–420
See application file for complete search history.

(56) References Cited

U.S. PATENT DOCUMENTS

| 8,244,223 | B2 | 8/2012 | Farah |
| 8,615,272 | B2 | 12/2013 | Chatrath |
| 8,781,454 | B2 | 7/2014 | Li et al. |
| 9,198,027 | B2 | 11/2015 | Urbanek |
| 2004/0198356 | A1 | 10/2004 | Dunlop et al. |
| 2009/0037207 | A1* | 2/2009 | Farah .................. G06Q 10/103 705/301 |
| 2011/0130140 | A1 | 6/2011 | Fadell |
| 2011/0306318 | A1 | 12/2011 | Rodgers et al. |
| 2012/0129513 | A1 | 5/2012 | van der Laak |
| 2014/0248852 | A1* | 9/2014 | Raleigh ............... H04M 15/723 455/407 |

(Continued)

FOREIGN PATENT DOCUMENTS

WO 2014151909 A1 9/2014

OTHER PUBLICATIONS

Meukel et al., "E-SIM for consumers—a game changer in mobile telecommunications?" McKinsey & Company, Telecom, Media & High Tech Extranet, Sep. 30, 2015, pp. 1-9.

(Continued)

*Primary Examiner* — Charles Appiah
*Assistant Examiner* — Jaime Holliday
(74) *Attorney, Agent, or Firm* — Zilka-Kotab, PC

(57) ABSTRACT

A system, method, and computer program product are provided for device management. In use, a first profile associated with a first device is identified. A second profile for a second device is then identified, based on the identification of the first profile associated with the first device. To this end, the second profile is communicated to the second device, for use in connection with management of the second device.

7 Claims, 7 Drawing Sheets

(56) References Cited

U.S. PATENT DOCUMENTS

2015/0365778 A1* 12/2015 Khan .................. H04W 8/18
　　　　　　　　　　　　　　　　　　　　　455/419

OTHER PUBLICATIONS

"Project Fi," Google, Apr. 2015, pp. 1-5, retrieved from https://fi.google.com/about/.

* cited by examiner

SYSTEM, METHOD, AND COMPUTER PROGRAM FOR DEVICE MANAGEMENT

FIELD OF THE INVENTION

The present invention relates to device management, and more particularly to managing various aspects of devices.

BACKGROUND

A variety of device management systems exist for management (e.g. activation, etc.) of new or previously-owned devices for use in a telecommunication network. For example, solutions exist for allowing a device to be automatically transferred between operators, in a manner that is seamless to customers. With that said, such solutions are limited in terms of a scope of devices that may be serviced and/or an ability to accommodate embedded communication channels (e.g. embedded-SIM, soft-SIM, etc.).

There is thus a need for addressing these and/or other issues associated with the prior art.

SUMMARY

A system, method, and computer program product are provided for device management. In use, a first profile associated with a first device is identified. A second profile for a second device is then identified, based on the identification of the first profile associated with the first device. To this end, the second profile is communicated to the second device, for use in connection with management of the second device.

DETAILED DESCRIPTION

Figure 1:
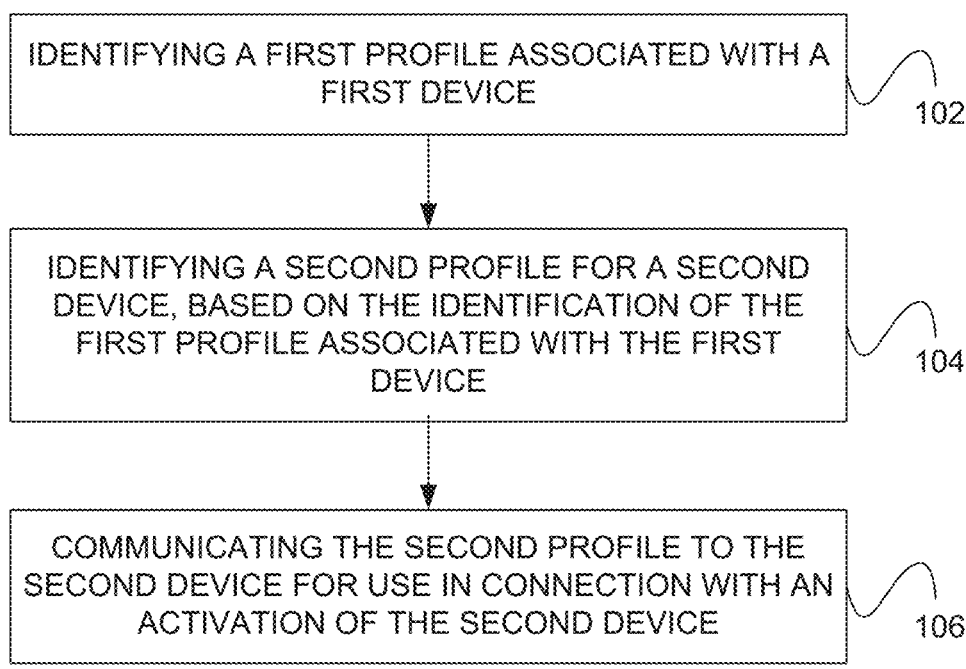
FIG. 1 illustrates a method for device management, in accordance with one embodiment.

FIG. 1 illustrates a method 100 for device management, in accordance with one embodiment. In one embodiment, such management may involve activation of a device. In the context of the present description, activation refers to an activation of any aspect of a particular device. Just by way of example, in one possible embodiment, such activation may refer to an activation of a device for use in a telecommunication network.

As indicated in operation 102, a first profile associated with a first device is identified. In the context of the present description, a profile refers to any information capable of being associated with a device. Just by way of example, in various embodiments, a profile may include at least one of: a customer identifier, a device identifier, a telecommunication provider identifier, an account identifier, a payment plan identifier, and/or a usage plan identifier.

Also in the context of the present description, a device refers to any machine that is capable of communication with another device. Just by way of examples, a device may include, but is not limited to a phone, a wearable (e.g. watch, ring, etc.), a household appliance, a vehicle (e.g. car, boat, etc.), a device with a subscriber identify module (SIM)-based channel, and/or any other machine with communication capabilities. In the context of a SIM-equipped device, such SIM may take any form including, but not limited to an embedded SIM, a soft-SIM, full-size SIM, micro-SIM, nano-SIM, and/or any other type of SIM, for that matter. Still yet, it should be noted that the device may be new and/or previously-owned (i.e. second hand, etc.). For instance, with respect to previously-owned devices, such device may have been acquired in the past and set-up for a specific telecommunication provider with a specific plan, and is thereafter sold again to a different entity (e.g. customer, store, etc.).

With continued reference to FIG. 1, a second profile for a second device is then identified, based on the identification of the first profile associated with the first device. See operation 102. In various embodiments, this may be accomplished utilizing a server. Specifically, the first profile associated with the first device may, in one embodiment, be identified by receiving the first profile associated with the first device at a server. This may be accomplished via a portal, for example. Further, the second profile for the second device may be identified utilizing the server, as well. In other embodiments, the first profile associated with the first device may be identified by receiving the first profile associated with the first device at the second device (e.g. via a short-range communication protocol, etc.).

To this end, the second profile is communicated to the second device, for use in connection with management (e.g. activation, etc.) of the second device. See operation 104. As mentioned earlier, such activation may take any desired form. In various embodiments, for instance, it may involve adding the second device to a logical account, payment plan, and/or usage plan (e.g. involving data, voice, and/or short message service (SMS), etc.) associated with the first device. It should be noted that users of the present method 100 may refer to owners and/or users of the device(s) and/or sale associates that may assist such owners and/or users during device activation.

In some embodiments, one or more options may be identified for the second device. Again, such options may involve at least one of a payment plan option, and/or a usage plan option. Further, to simplify the activation, the one or more options may be automatically selected for the device, if the one or more options include a single option (or even when there are multiple options). On the other hand, a user may be prompted to select at least one of the options for the device.

It should also be noted that the method 100 may be implemented utilizing various hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

For example, an ownership of at least one of the first device and/or the second device may be changed, in various embodiments.

Further, in other optional embodiments, revenue generated in connection with the second device may be shared among a plurality of entities (e.g. a device manufacturer, a telecommunication service provider, or an application developer, etc.) In such embodiment, the various entities may receive, in addition to a revenue share, various statistics, such as how many devices of a specific type have been activated at a given operator. For instance, a device manufacturer may be informed that their device has been activated W times today in a predetermined network, X users chose usage plan A (e.g. $B per C GB) and Y users chose plan D (e.g. E$ for unlimited data), and that the average data consumption per customer is Z MB per day. In general, all information can be exposed from the telecommunication provider to the other parties and such information may include relevant statistics and/or data regarding the devices, chosen plans by customer, device usage by customers, amount of consumption by customers (e.g. how much data they are using, etc.).

Figure 2:
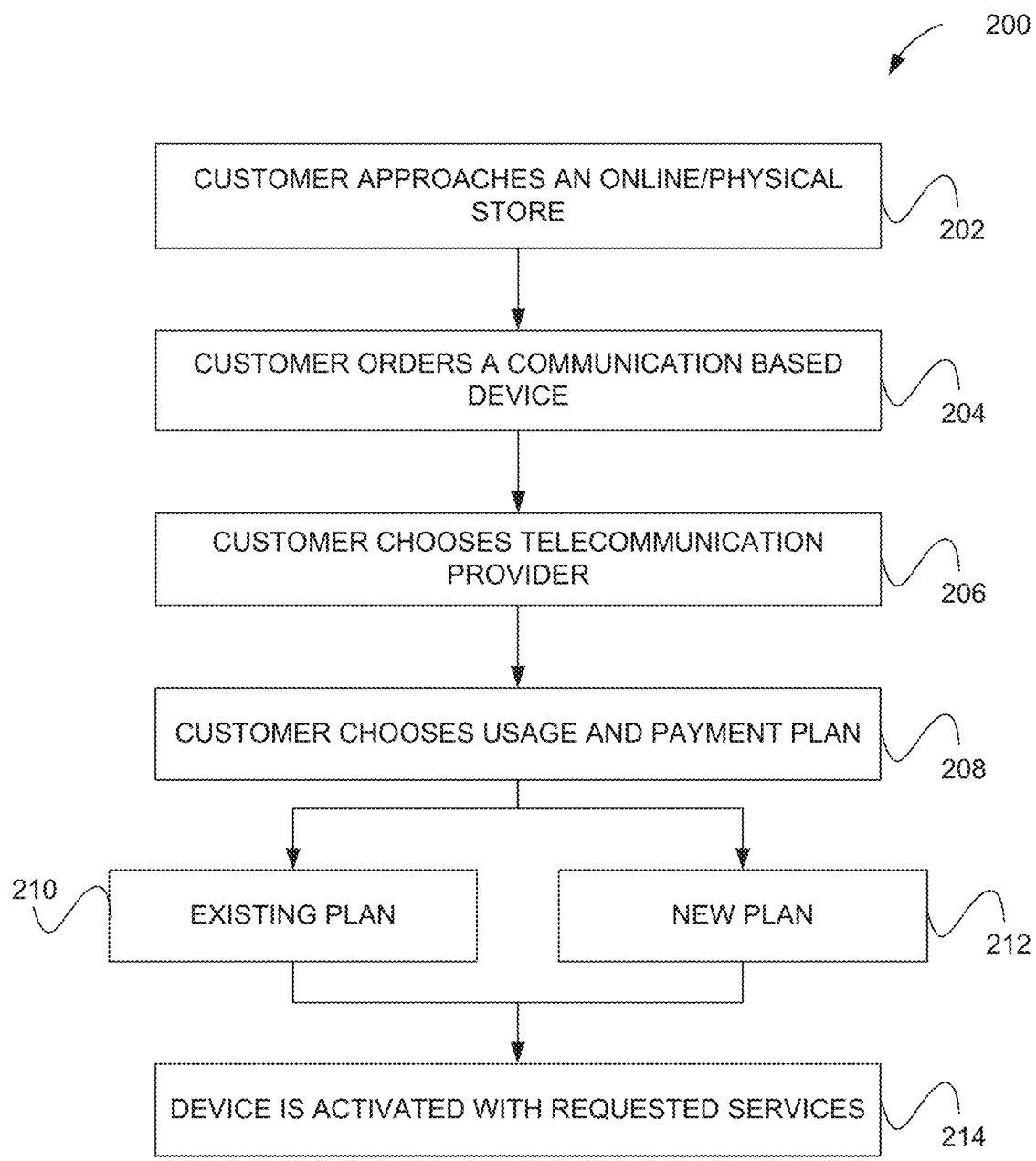
FIG. 2 illustrates a method for activating a new device, in accordance with one embodiment.

FIG. 2 illustrates a method 200 for activating a new device, in accordance with one embodiment. As an option, the method 200 may be implemented in the context of the details of FIG. 1 and/or any subsequent figure(s). Of course, however, the method 200 may be implemented in the context of any desired environment. Further, the aforementioned definitions may equally apply to the description below.

As shown, a business is approached by a customer. See operation 202. In various embodiments, this may be accomplished by the customer directly accessing an on-line portal (e.g. self-service portal, web-site, mobile application, etc.). In other embodiments, the business may be approached by the customer entering a brick and mortar store and/or placing a call into a call center [and/or engaging in other forms of communication (e.g. e-mail, chat, etc.)], and engaging a sales associate. Such sales associate may, in turn, access the aforementioned on-line portal (or other similar mechanism) on behalf of or in connection with the customer.

After the interaction of operation 202, the customer may order a device with communication capabilities. See operation 204. This may be accomplished by selecting a model and, possibly, optional features to accompany the device.

With continuing reference to FIG. 2, the customer may choose a telecommunication provider in operation 206, and a plan (e.g. payment, usage, etc. policies) in operation 208. In various embodiments, only those telecommunication providers and/or plans that are available for the device, may be presented for selection.

As shown, if eligible, the customer may choose to associate the newly acquired device to an existing plan (e.g. an existing family plan, etc.) as indicated in operation 210, or initiate a new plan as indicated in operation 212. To this end, the method 200 accommodates situations where the customer may already have a plan with usage and payment policies at a selected telecommunications provider. To the extent that another telecommunications provider is compatible, the customer may also be given an option to attach the newly-purchased device to the existing plan that the customer holds. Of course, in some embodiments, additional fees may nevertheless be applied to the customer regardless as to whether the customer has selected an existing plan. On the other hand, the customer may choose to attach the newly-purchased device to a new plan with corresponding usage and payment policies.

In one embodiment, various options regarding telecommunication service provider and/or plans may be conditionally presented based on what is available. Such availability may be a function of the device (e.g. device features, etc.) and/or the customer (e.g. profile features, etc.). For instance, if only one option is available, the selection thereof may be done automatically for the customer, leaving the customer only needing to approve the same. The customer may also call the telecommunication provider directly to engage in the process described herein. To this end, the device may be activated, per operation 214.

Figure 3:
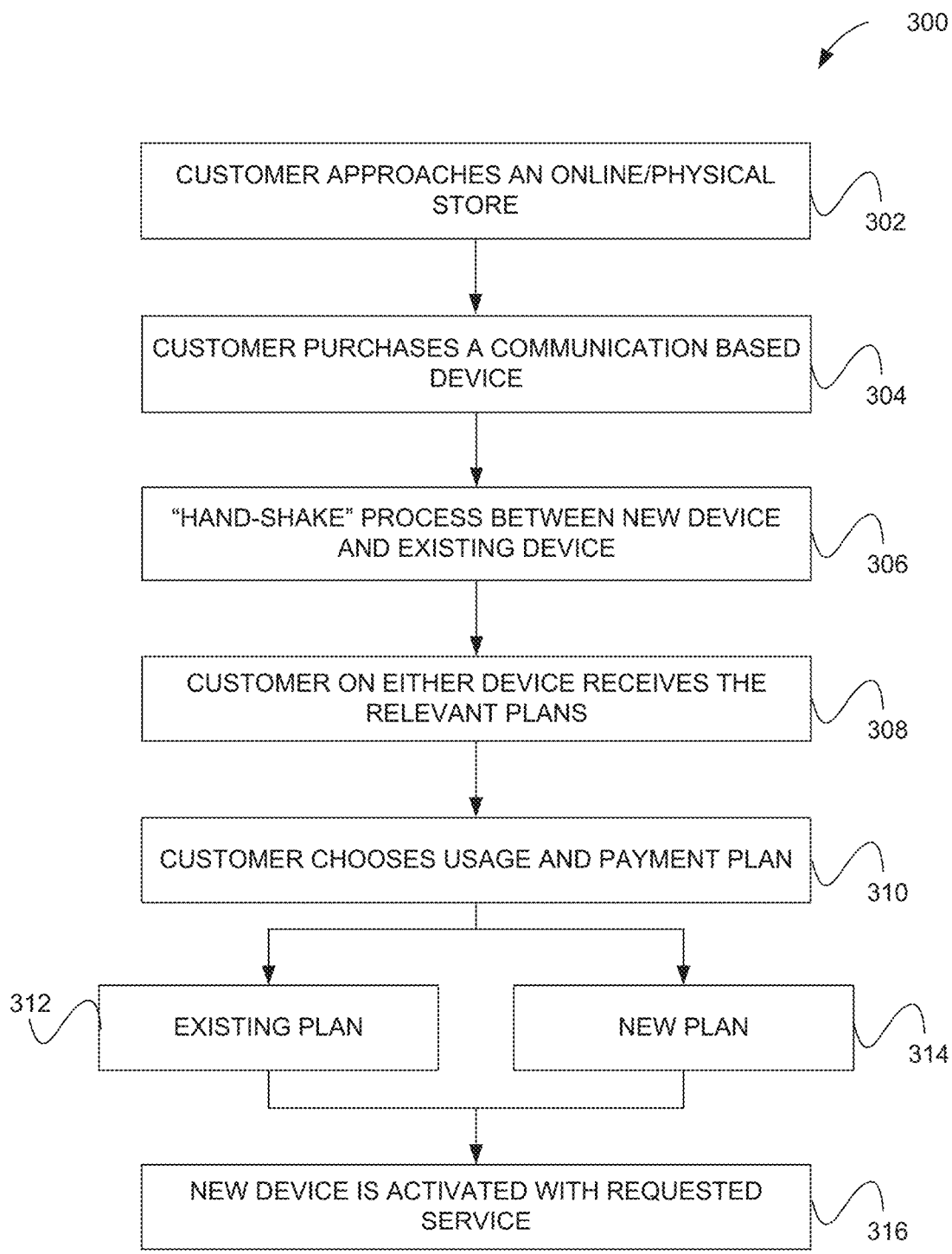
FIG. 3 illustrates a method for activating a new device, in accordance with an automated embodiment.

FIG. 3 illustrates a method 300 for activating a new device, in accordance with an automated embodiment. As an option, the method 300 may be implemented in the context of the details of previous and/or any subsequent figure(s). Of course, however, the method 300 may be implemented in the context of any desired environment. Further, the aforementioned definitions may equally apply to the description below.

Similar to the method 200 of FIG. 2, the method 300 of FIG. 3 begins by a business being approached by a customer. See operation 302. Again, this may be accomplished by the customer directly accessing an on-line portal (e.g. self-service portal, web-site, mobile application, etc.). Further, in the other embodiments, the business may be approached by the customer entering a brick and mortar store and/or placing a call into a call center [and/or engaging in other forms of communication (e.g. e-mail, chat, etc.)], and engaging a sales associate who may, in turn, access the aforementioned on-line portal (or other similar mechanism) on behalf of or in connection with the customer.

After 302, the customer may order a device with communication capabilities. See operation 304. This may be accomplished by selecting a model and, possibly, optional features to accompany the device. Of course, this may be accomplished in any desired manner. For instance, a user may have purchased a smartwatch from an on-line retailer and had it shipped to their home, so that it can be activated from home.

Following or during the selection and/or purchase of the device, the customer may use an existing, previously-activated device to conduct a handshake between the previously-activated device and the new device, utilizing a short range communication protocol [e.g. Bluetooth, ZigBee, Wi-Fi, near field communication (NFC), and/or absolutely any communication protocol, etc.]. Of course, in different embodiments, any form of communication may be utilized which enables multiple devices to communicate. To this end, such different embodiments may not necessarily be limited to the use of short range communication protocols, and thus there may be no restriction as to the distance required between the devices.

In varying embodiments, the foregoing handshake process between the two devices may be carried out in a variety of different ways. For example, in one embodiment, before and/or while the handshake process takes place, the devices may be aware that they are entering a handshake mode. Further, when the handshake process occurs the new device may communicate to the previously-activated device that the handshake process requested is resulting in a connection with the telecommunication provider already associated with the previously-activated device.

By way of the abovementioned handshake, one or more or series of back-and-forth communications may be utilized to automatically and seamlessly assign the telecommunication provider of the previously-activated device, to the new device. Further, in various embodiments, the customer may be given the choice to associate the new device to a new plan and/or to an existing plan already associated with the previously-activated device.

It should be noted that, in various embodiments, the previously-activated device does not necessarily have to be owned by a customer, but may be in other embodiments. For instance, a sales associate may initiate the aforementioned handshake with a previously-activated device in a store. Still yet, the previously-activated device does not necessarily need to (but may) be a SIM-based device. For example, in one embodiment, the customer may connect to their private WiFi network at home, which is, in turn, connected to a telecommunication provider which may recognize the device for activation purposes.

As a result of the handshake, the new device may be associated (e.g. assigned to, activated to use, registered with, etc.) the telecommunication provider already associated with the previously-activated device. On the other hand, if the customer wishes to choose a different telecommunication provider than that associated with the previously-activated device, such customer may be required to engage in another manual activation process. Once the telecommunication provider is automatically associated with the new device, a list of payment and/or billing plans may be sent to the new device for presentation to the customer using the new device. See operation 308.

In various embodiments, operation 308 may be accomplished in any desired manner. For instance, the new device may receive such information from the previously-activated device during the handshake. Further, the information may already be resident on the previously-activated device or retrieved from a server managed by the telecommunication provider already associated with the previously-activated device. Still yet, the aforementioned information may be managed by a third-party that collects such information from different telecommunication providers. Even still, in other embodiments, the information may simply be directly retrieved from the telecommunication provider and/or third-party utilizing the new device.

To this end, the customer may choose a plan which will dictate usage and/or payment policy for the new device. In some embodiments, the plan options may involve an existing plan (see operation 312), in which case the customer may already have a plan with usage and payment policies at the previously selected telecommunications provider. If the telecommunications provider is compatible with the new device, the customer may associate the new device with such existing plan. Again, additional fees may apply regardless of the fact that the customer selects an existing plan.

On the other hand, the customer may choose to associate the new device with a new plan with different usage and/or payment policies. See operation 314. In one possible embodiment, if only one choice is available, the selection thereof may be done automatically for the customer, leaving the customer only to approve the same. It should be noted that such "one-choice" streamlined approach may be applied to both the plans, as well as the available telecommunication providers. It should be noted that other embodiments are contemplated where automatic option selection may occur in situations where multiple options exist, whereby business rules, etc. may be used based on the information collected, to automatically define a best choice. In any case, the new device may thus be activated, per operation 316.

Various examples will now be set forth illustrating how automatic verification of device eligibility and/or compatibility with respect to a given network, may be implemented. In the present embodiment, prior to activation, an automatic verification process may be initiated for the new device in order to verify if the new device is eligible and compatible to be registered on the requested network. It should be noted that such feature is not restricted to telecommunication providers involving cellular networks.

In a first example, a previously-activated device may take the form of a mobile phone registered to a first network service provider. Further, the new device may include a smartwatch with cellular capabilities (e.g. equipped with a cellular modem, etc.). In such example, the new device may receive profile information (including a cellular connectivity plan of the first network service provider) from the previously-activated device, since the new device is able (i.e. has the necessary hardware, etc.) to be registered with the first network service provider.

In a second example, a previously-activated device may take the form of a mobile phone registered to a first network service provider. Further, the new device may include a smartwatch without cellular capabilities (e.g. equipped with just a WiFi or Bluetooth modem, etc.). In such example, the new device may not necessarily receive profile information (including a cellular connectivity plan of the first network service provider) from the previously-activated device, since the new device is not able (i.e. does not have the necessary hardware, etc.) to be registered with the first network service provider.

Figure 4:
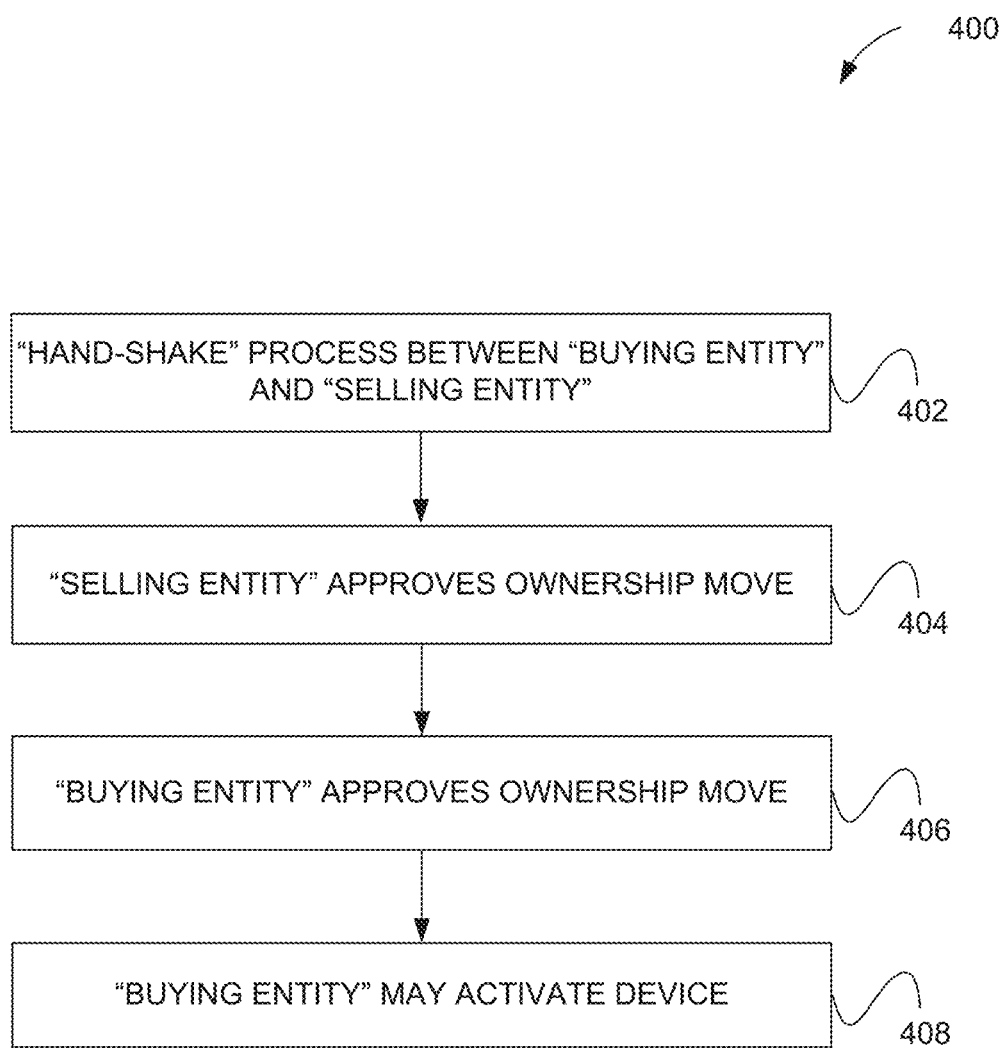
FIG. 4 illustrates a method for activating a previously-owned device, in accordance with another embodiment.

FIG. 4 illustrates a method 400 for activating a previously-owned device, in accordance with another embodiment. As an option, the method 400 may be implemented in the context of the details of previous and/or any subsequent figure(s). Of course, however, the method 400 may be implemented in the context of any desired environment. Further, the aforementioned definitions may equally apply to the description below.

As illustrated in FIG. 4, the method 400 involves the activation of a previously-owned device. As shown, following and/or during the purchase of the previously-owned device, a selling entity and/or a buying entity may initiate a handshake involving the previously-owned device. See operation 402. Of course, such handshake may or may not be similar to that described in connection with the method 300 of FIG. 3. Further, the handshake may be between the previously-owned device, and one or more previously-activated device(s) of the buying entity and/or the selling entity.

It should be noted that other embodiments are contemplated where the handshake process of operation 402 is avoided. In such embodiment, the buying entity and selling entity may use a manual channel to complete the transfer process. For example, a portal, website, mobile application, etc. may be used for such purpose.

Still yet, before and/or during and/or after the handshake process, the selling entity may be prompted to approve a transfer of ownership from the selling entity to the buying entity. See operation 404. Further, the buying entity may also be prompted to approve the transfer, as well, per operation 406. These approvals may be accomplished via a display device and/or input device (e.g. touchscreen, etc.) of any of the devices involved in the aforementioned handshake (and/or any other device(s), for that matter). In one possible embodiment, an account identifier/password and/or any other authentication mechanism (e.g. biometric, etc.) may further be required to complete the approval of the transfer of ownership. Of course, the change of ownership may be initiated by either the selling and/or buying entity. Further, a change of ownership confirmation communication (e.g. email, etc.) may be sent to the buying entity and/or the selling entity.

Next, the buying entity may use any desired method for activating the previously-owned device, which is now owned by the buying entity. For example, in one embodiment, the method 200 of FIG. 2 may be employed, while, in other embodiments, the method 300 of FIG. 3 may be employed.

In another embodiment that may constitute a possible variation on any of the methods disclosed herein, a technique may be provided for accommodating a scenario where a customer terminates a relationship with an existing telecommunication provider. In such embodiment, the existing telecommunication provider that is the subject of such termination by the customer may also receive a notification that the customer has left the associated network. In different embodiments, informing the existing telecommunication provider that a contract/service is being terminated may occur when a device is pre-integrated with an active SIM.

Figure 5:
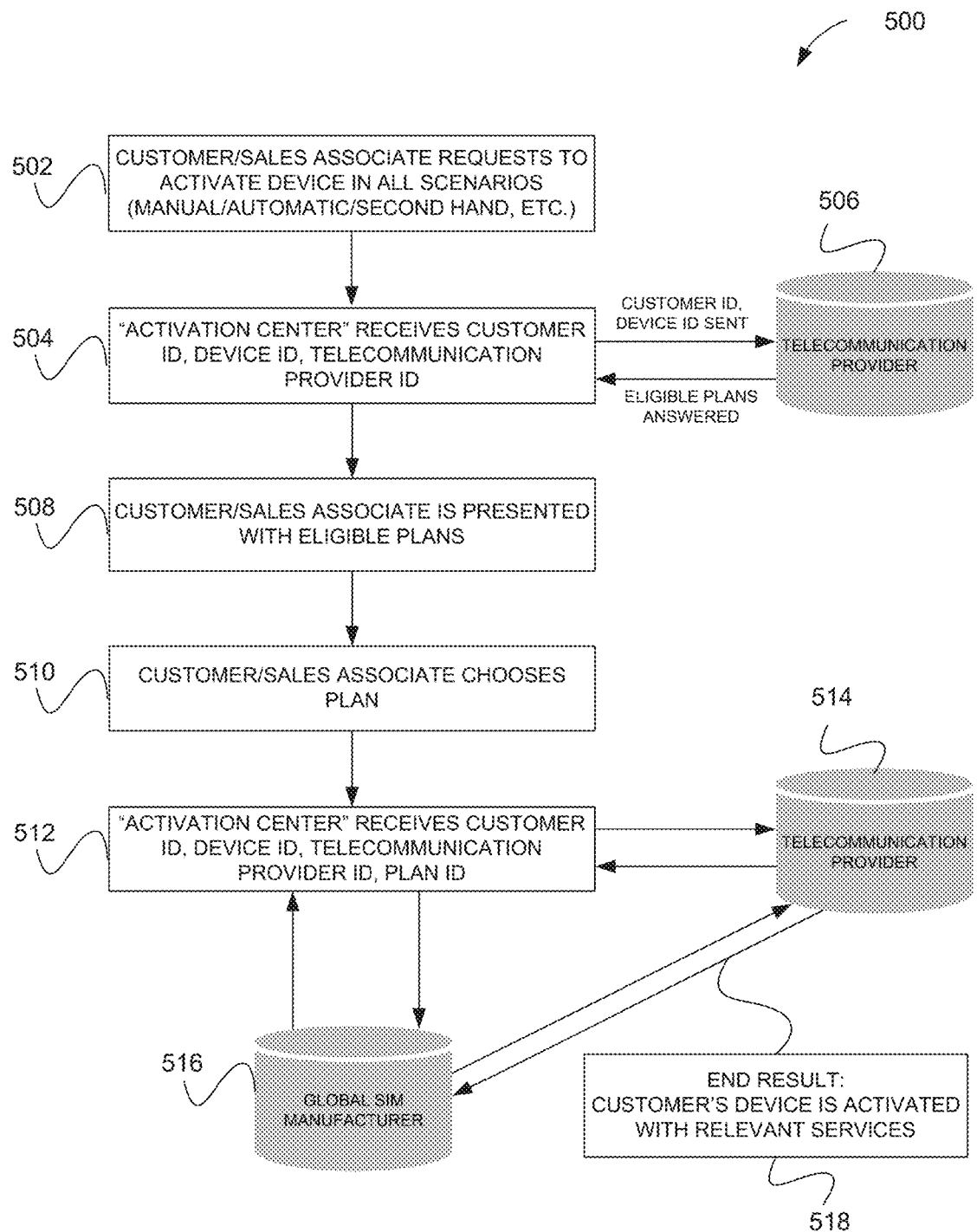
FIG. 5 illustrates a method for activating a new device, in accordance with yet another embodiment.

FIG. 5 illustrates a method 500 for activating a new device, in accordance with yet another embodiment. As an option, the method 500 may be implemented in the context of the details of previous and/or any subsequent figure(s). Of course, however, the method 500 may be implemented in the context of any desired environment. Further, the aforementioned definitions may equally apply to the description below.

As shown, a request is initially received to activate a new device. See operation 502. As mentioned earlier in the context of previously-described embodiments, such request may be received directly from a customer and/or indirectly via a sales associate, and may further be received either on-line and/or off-line.

Next, in operation 504, an activation center receives profile information. In one possible embodiment, the activation center may be include a software as a service (SaaS) platform including one or more servers managed by a third party that is separate from one or more telecommunication providers. Of course, other embodiments are contemplated whereby the activation center is managed by the one or more telecommunication providers.

Further, the receipt of such profile information may be the result of manual entry of such information via a web portal and/or via an automated retrieval in connection with a handshake process such as that described during the context of previously-described embodiments. Even still, the profile information may include a customer identifier, a device identifier, a telecommunication provider identifier, and/or any other desired profile information.

To this end, part and/or all of such profile information may be utilized by the activation center to retrieve, request, and/or look-up eligible payment and/or usage plans via one or more telecommunication provider databases 506. Upon receipt of such eligible payment and/or usage plans, the customer may be directly and/or indirectly be presented with the same. See operation 508. Again, this may be accomplished via the aforementioned activation center and/or directly via a previously-activated and/or new device.

In response, the customer may directly and/or indirectly choose one or more of the eligible payment and/or usage plans. See operation 510. As shown in operation 512, 514, and 516; the activation center may, in one embodiment, remain in control of all activation and/or update SIM profile information between the relevant telecommunication providers. For example, in scenarios where a customer has left an existing telecommunication provider or a device is pre-integrated with a SIM, the telecommunication provider may be informed.

By the activation center acting as an intermediary between the telecommunication providers and the SIM manufacturers, any communication between such entities may be facilitated. To this end, the new device may be activated in a more seamless, convenient manner. See operation 518. It should be noted that other embodiments are contemplated where the telecommunication provider may contact the SIM manufactures by themselves. For example, an activation center may notify the telecommunication provider about a need for a SIM profile update, and the telecommunication provider may, in turn, contact the SIM manufacture provider, such that the telecommunication provider executes the change and, at the end, notifies the activation center that the action has been taken.

By the design of the various embodiments described herein, activation may be ideally suited for Internet of Things (IoT)-type devices. IoT-type devices, such as smartwatches, hold an embedded communication channel (e.g. embedded-SIM, Soft-SIM, etc.) which the customer cannot necessarily access, remove, or change (in some embodiments). This means that, even if the IoT-type device is unlocked, the customer cannot necessarily choose to change the communication provider associated with such IoT-type device.

Various embodiments also have utility in SIM-based devices, as well. If a customer wishes to change a telecommunication provider on a device with an accessible connectivity entity such as a nano-SIM, such customer must remove the existing nano-SIM and change it with a new SIM. Using one or more of the features described herein, such process may be made more a seamless, by providing a self-service, over-the air process in which the user does not necessarily (but may) need to remove their existing nano-SIM. To this end, various embodiments described herein provide the customer with a self-service, worldwide accessible experience in which the customer may control the communication provider on their device.

Figure 6:
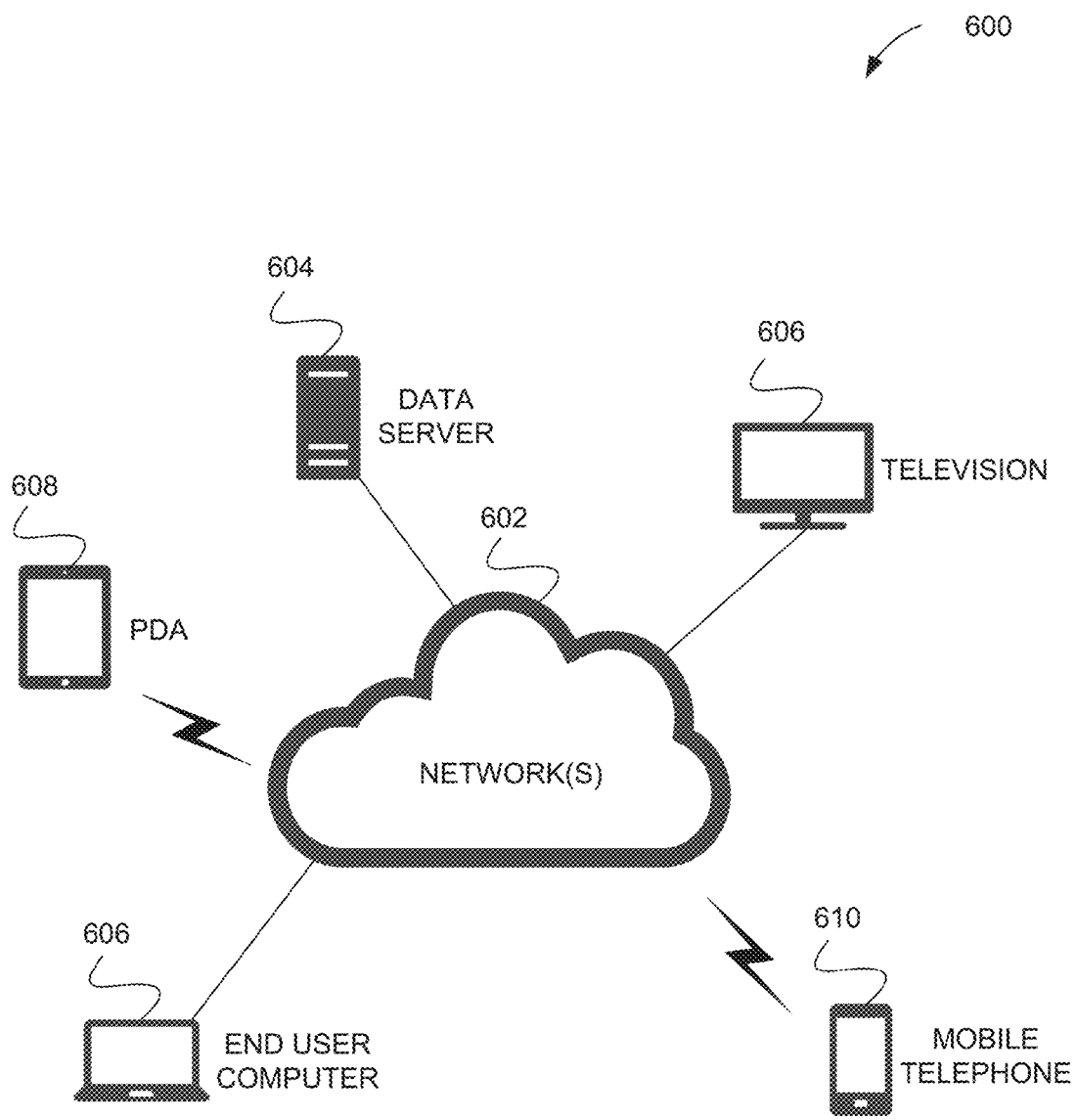
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
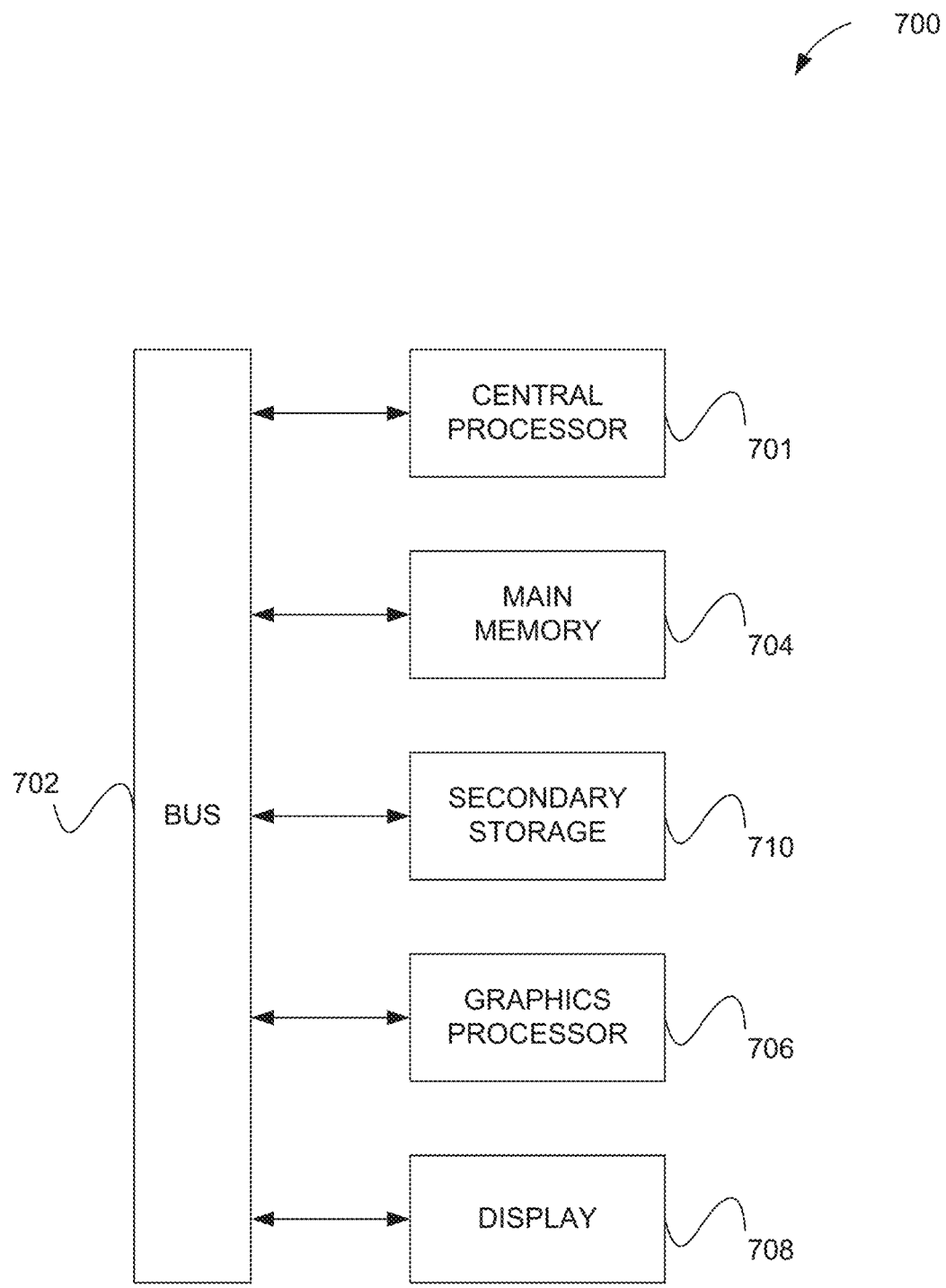
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising computer code for:
   initiating, by a first mobile device, a handshake process with a second mobile device, the first mobile device having an existing account with a network service provider and a usage plan with the network service provider;
   identifying, by the first mobile device, a first profile associated with the first mobile device, the first profile indicating the network service provider with which the first mobile device has the existing account;
   automatically verifying, by the first mobile device, that the second mobile device is eligible and compatible to be registered with the network service provider;
   responsive to the verification that the second mobile device is eligible and compatible to be registered with the network service provider, automatically assigning, to the second mobile device by the first mobile device through the handshake process, the network service provider identified from the first profile, wherein the automatic assigning of the network service provider to the second mobile device includes:
      (a) activating the second mobile device to use the network service provider,
      (b) adding the second mobile device to the existing account of the first mobile device with the network service provider, and
      (c) adding the second mobile device to the usage plan of the first mobile device with the network service provider;
   receiving, during the handshake process by the first mobile device, a communication from the second mobile device indicating that the handshake process is resulting in a connection of the second mobile device with the network service provider.

2. The computer program product of claim 1, wherein the computer program product is configured for changing an ownership of the second mobile device.

3. The computer program product of claim 1, wherein the handshake process utilizes a short-range communication protocol.

4. The computer program product of claim 1, wherein the computer program product is configured for sharing at least one of revenue generated or data statistics in connection with the second mobile device among one or more of a plurality of entities.

5. The computer program product of claim 4, wherein the computer program product is configured such that the entities include at least one of a device manufacturer, the network service provider, or an application developer.

6. A method, comprising:
   initiating, by a first mobile device, a handshake process with a second mobile device, the first mobile device having an existing account with a network service provider and a usage plan with the network service provider;
   identifying, by the first mobile device, a first profile associated with the first mobile device, the first profile indicating the network service provider with which the first mobile device has the existing account;
   automatically verifying, by the first mobile device, that the second mobile device is eligible and compatible to be registered with the network service provider;
   responsive to the verification that the second mobile device is eligible and compatible to be registered with the network service provider, automatically assigning, to the second mobile device by the first mobile device through the handshake process, the network service provider identified from the first profile, wherein the automatic assigning of the network service provider to the second mobile device includes:
      (a) activating the second mobile device to use the network service provider,
      (b) adding the second mobile device to the existing account of the first mobile device with the network service provider, and
      (c) adding the second mobile device to the usage plan of the first mobile device with the network service provider;
   receiving, during the handshake process by the first mobile device, a communication from the second mobile device indicating that the handshake process is resulting in a connection of the second mobile device with the network service provider.

7. A system, comprising:
   one or more hardware processors of a first mobile device for:
   initiating, by the first mobile device, a handshake process with a second mobile device, the first mobile device having an existing account with a network service provider and a usage plan with the network service provider;
   identifying, by the first mobile device, a first profile associated with the first mobile device, the first profile indicating the network service provider with which the first mobile device has the existing account;
   automatically verifying, by the first mobile device, that the second mobile device is eligible and compatible to be registered with the network service provider;
   responsive to the verification that the second mobile device is eligible and compatible to be registered with the network service provider, automatically assigning, to the second mobile device by the first mobile device through the handshake process, the network service provider identified from the first profile, wherein the automatic assigning of the network service provider to the second mobile device includes:
      (a) activating the second mobile device to use the network service provider,
      (b) adding the second mobile device to the existing account of the first mobile device with the network service provider, and
      (c) adding the second mobile device to the usage plan of the first mobile device with the network service provider;
   receiving, during the handshake process by the first mobile device, a communication from the second mobile device indicating that the handshake process is resulting in a connection of the second mobile device with the network service provider.

* * * * *